(12) United States Patent
Price (10) Patent No.: US 6,196,777 B1
(45) Date of Patent: Mar. 6, 2001

(54) VEHICULAR CARGO ANCHOR

(76) Inventor: Brent A. Price, 1211 Bonfoy Ave., Colorado Springs, CO (US) 80907

( * ) Notice: Subject to any disclaimer, the term of this patent is extended or adjusted under 35 U.S.C. 154(b) by 0 days.

(21) Appl. No.: 09/429,064

(22) Filed: Oct. 29, 1999

(51) Int. Cl.⁷ .................................................. B60P 7/08
(52) U.S. Cl. ......................... 410/102; 410/101; 410/106; 410/110
(58) Field of Search .................................... 410/101, 102, 410/106, 110, 116; 24/115 K, 265 CD; 248/499

(56) References Cited

U.S. PATENT DOCUMENTS

| | | | |
|---|---|---|---|
| 4,760,986 | * | 8/1988 | Harrison .......................... 410/110 X |
| 4,953,820 | * | 9/1990 | Yoder .............................. 410/110 X |
| 5,738,471 | * | 4/1998 | Zentner et al. ...................... 410/110 |
| 5,915,900 | * | 6/1999 | Boltz .................................... 410/110 |
| 6,000,890 | * | 12/1999 | Macias ................................ 410/116 |
| 6,030,159 | * | 2/2000 | Herrick et al. ....................... 410/102 |

* cited by examiner

Primary Examiner—Stephen T. Gordon
(74) Attorney, Agent, or Firm—Richard W. Hanes (57) ABSTRACT

A cargo anchor primarily intended for attachment to the upper edge of the side of an open bed truck, comprising a journal box and an integral clamping apparatus. The journal box comprises a base member, a cleat superimposed on the base member and screws for interconnecting the cleat to the base member. A transverse bore in at least one of either the base member or the cleat is disposed parallel to the base member and the cleat and is sized to carry a shaft or a "D" ring that functions to support load binding straps or ties. Integral with the journal box is a clamping device for attaching the journal box to a flat structural member.

13 Claims, 6 Drawing Sheets

VEHICULAR CARGO ANCHOR

The present invention relates to an implement that is attachable to a load carrying vehicle and is operative to secure or hold loads carried in the vehicle.

BACKGROUND

Vehicles such as pick-up trucks are incapacitated in their ability to accommodate cargo securing straps or lines because the sides of the truck bed are rarely, if ever, provided with sufficient rings, rails, brackets or holes by which a cargo securing strap can be anchored to the vehicle.

In some instances it is desirable to tie bulky cargo so that it will not move around in the bed of the truck or worse, leave the vehicle. In some instances it is desirable to position and hold certain types of loads in order to make room for other cargo, for example securing a bicycle in an upright position next to the side of the truck bed. Neither of these occasions are well served by the absence of anchoring facilities on pick-up trucks or similar vehicles.

It is therefore the primary object of the present invention to provide a universal cargo anchoring device that is readily attachable to the rolled upper edge of the side of a pick-up truck, dump truck or similar vehicle.

Secondarily, it is an object of the invention to provide a universal load anchoring device that can be attached to other portions of a vehicle or even a non moving structure.

Another object of the invention is to provide an anchor attachable to a structure, including a vehicle, that will support a shaft, axle or the like for the mounting of pivotal structures.

Other and still further objects, features and advantages of the present invention will become apparent upon a reading of the following detailed description of a preferred and alternative embodiments of the invention.

SUMMARY OF THE INVENTION

The cargo anchoring implement of the present invention comprises a journal box for a shaft and an integral screw operated clamping device for attaching the journal box to a supporting structure, such as, for example, the side of the bed of a pick-up or dump truck. In this specification and the concluding claims the anchoring device will be explained in terms of its intended use with an open bed truck such as a pick-up truck, but the general explanation is intended to include all such types of trucks that have upstanding bed sides that can present a purchase area for the clamping part of the anchoring device. The rolled or bent over upper edges of the sides of the open bed of a pick-up truck provided the exemplar to explain the various embodiments of the invention. The anchoring device can also be utilized on fixed structures.

The journal box includes a base member and an adjustable pressure cleat that is superimposed on the base member. The base member functions not only as part of the journal box but also as part of the clamping device. A bore traverses the journal box and is located so that a shaft journalized in the bore and sandwiched between the base member and the cleat can, depending on the diameter of the shaft and the adjustment of the pressure exerted by the cleat, be allowed to rotate and move longitudinally within the bore or be locked in a selected rotational and longitudinal position within the bore. The shaft serves to support pivotally rotatable load carrying rack elements or to hold load fastening means such as a strap, line, band, chain, rope, belt or to hold a ring for receiving such items.

DETAILED DESCRIPTION

Figure 1:
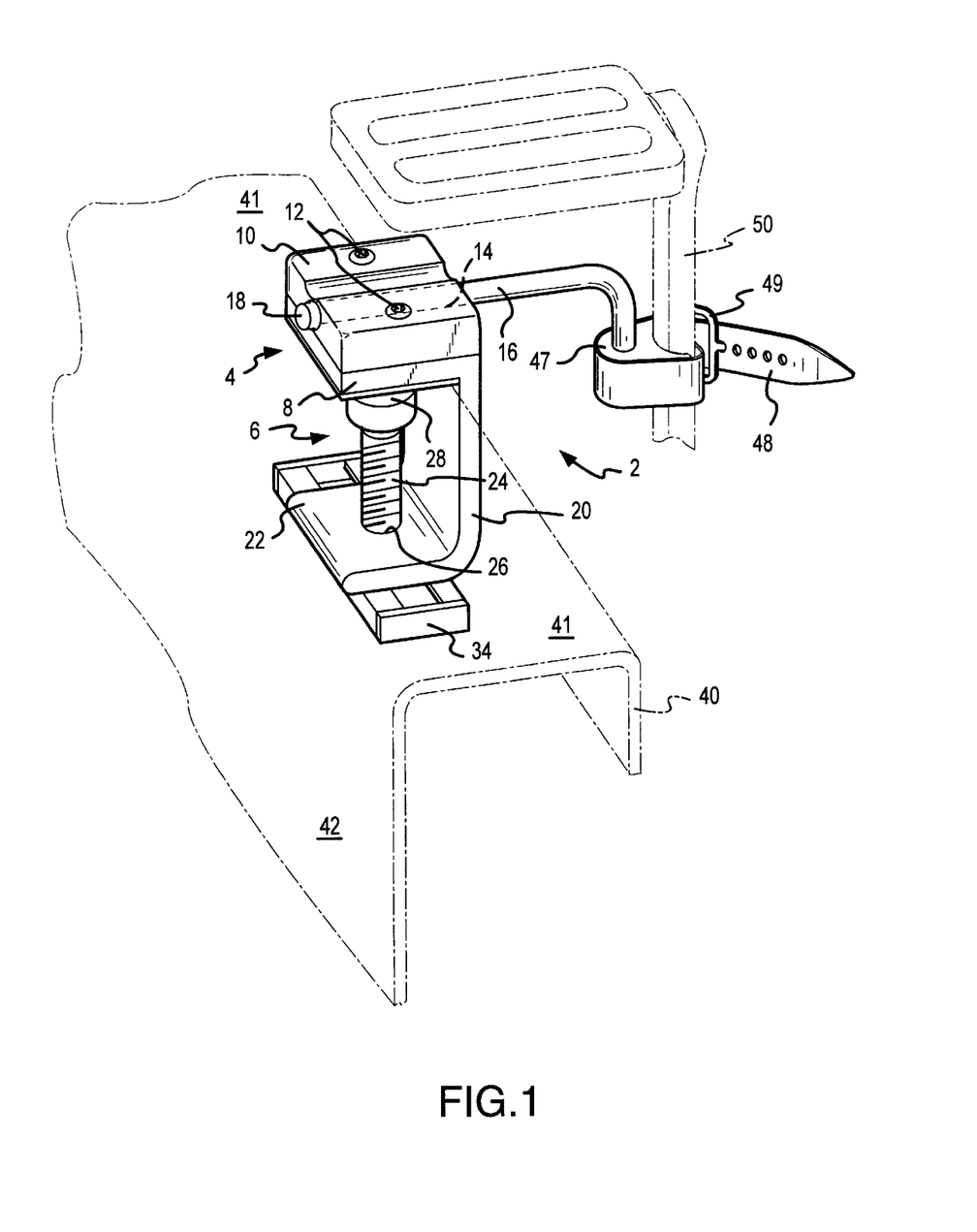
FIG. 1 is a perspective view of the anchoring device of the present invention as it would appear attached to the rolled, or bent over, upper edge of the side of the bed of a pick-up truck (shown fragmentarily in dotted lines). The crank arm and pedal of a bicycle loaded into the truck bed is fragmentarily shown in dotted lines.
Figure 2:
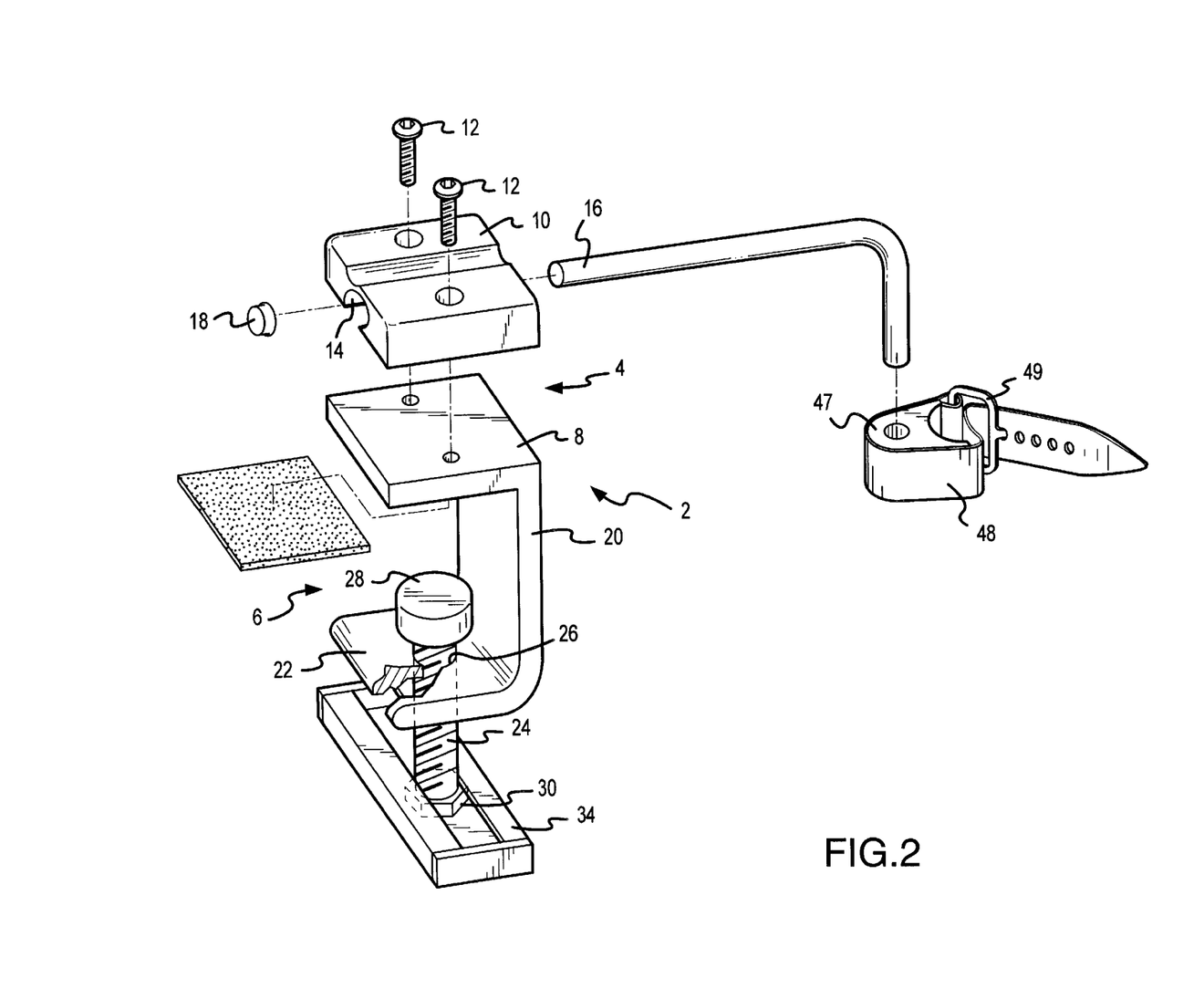
FIG. 2 is an exploded view of the anchor shown in FIG. 1.

For a detailed description of the various embodiments of the invention, we turn first to FIGS. 1 and 2. The preferred form of the anchor 2 comprises a journal box 4 and an integral clamping device 6. The journal box 4 includes a flat base member 8 and a superimposed cleat 10 that is adjustably secured to the base member by a pair of screws 12. The cleat 10 is provided with a transverse bore 14 that journals a cylindrical shaft 16. The shaft is sized and dimensioned so that the pressure exerted by the cleat 10 to sandwich the shaft between the cleat and the base member 8 can be adjusted to either lock the shaft in a fixed position or permit the shaft to both rotate and move longitudinally. An end cap 18 attached to the end of the shaft 16 prevents the shaft from being pulled through the journal box bore 14.

Integral with and depending from one side of the journal box's base member 8 is a rigid flattened and elongated member that can be characterized as the upright stem 20 of the letter "C." The base member 8, the stem 20 and an integral, laterally extending platform 22, that is parallel with the base member 8, constitutes the frame of a "C" clamp. The operative mechanism that cooperates with the "C" shaped frame includes a threaded screw 24 that threadingly engages an aperture 26 in the laterally extending platform 22. The screw is provided with a bearing pad 28 on the inner end thereof and a head 30 on the outer end thereof. A handle 34, or finger tab, is functionally attached to the outer end of the screw, preferably utilizing the head 30 to fit into a channel shaped handle member, as shown in FIGS. 1 and 2.

The generally "C" shaped frame of the clamp 6 is specifically designed to fit over at least a portion of the flat bent over upper extremity 41 of the side 42 of the bed of a pick-up truck and around the down turned inside edge 40 thereof. The threaded clamping screw 24 and the cushioning pad 28 are adapted to operatively engage the underside of the flat bent over upper extremity 41 when the screw is tightened. The clamping action provided by the combination of the base member engaging the top surface of the bent over edge 40 and the screw contacting the underside of the bent over edge secures the journal box to the upper edge of the truck bed.

The shaft 16 is shaped to accommodate the type of load to be anchored.

The shaft 16 of the embodiment of FIGS. 1 and 2 includes an end portion that is bent 90° to the axis of the shaft. This transverse "L" shape accommodates the attachment of a rubber grommet 47 that serves as the base for a strap 48 and a buckle 49. The strap 48 encircles the crank arm 50 of a bicycle pedal assembly to tightly secure the bicycle that is standing on the floor of the truck bed against the inside of the side of the truck bed. If more than one anchor point is desired, another anchor of the same type may be used to tie down one of the frame members of the bicycle. Depending on the size, shape and design of the bicycle, it may be necessary or convenient for the combination of the grommet 47 and strap 48 to be closer to or farther away from the down turned upper edge of the bed side. By loosening the screws 12 and relieving the sandwiching pressure on the shaft 16, the shaft may be rotated or moved longitudinally to position it and the lateral end thereof in a position of maximum convenience for wrapping the strap 48 around structural member of the load.

Figure 3:
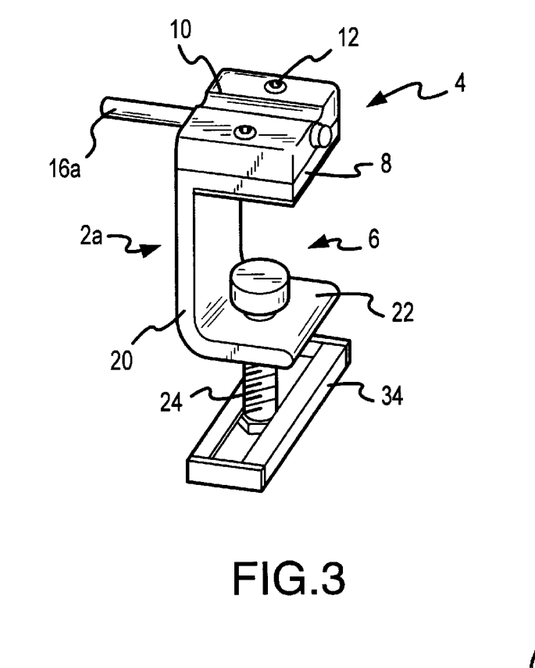
FIG. 3 is a perspective view of the anchor of the present invention with a straight shaft journaled by the journal box.
Figure 4:
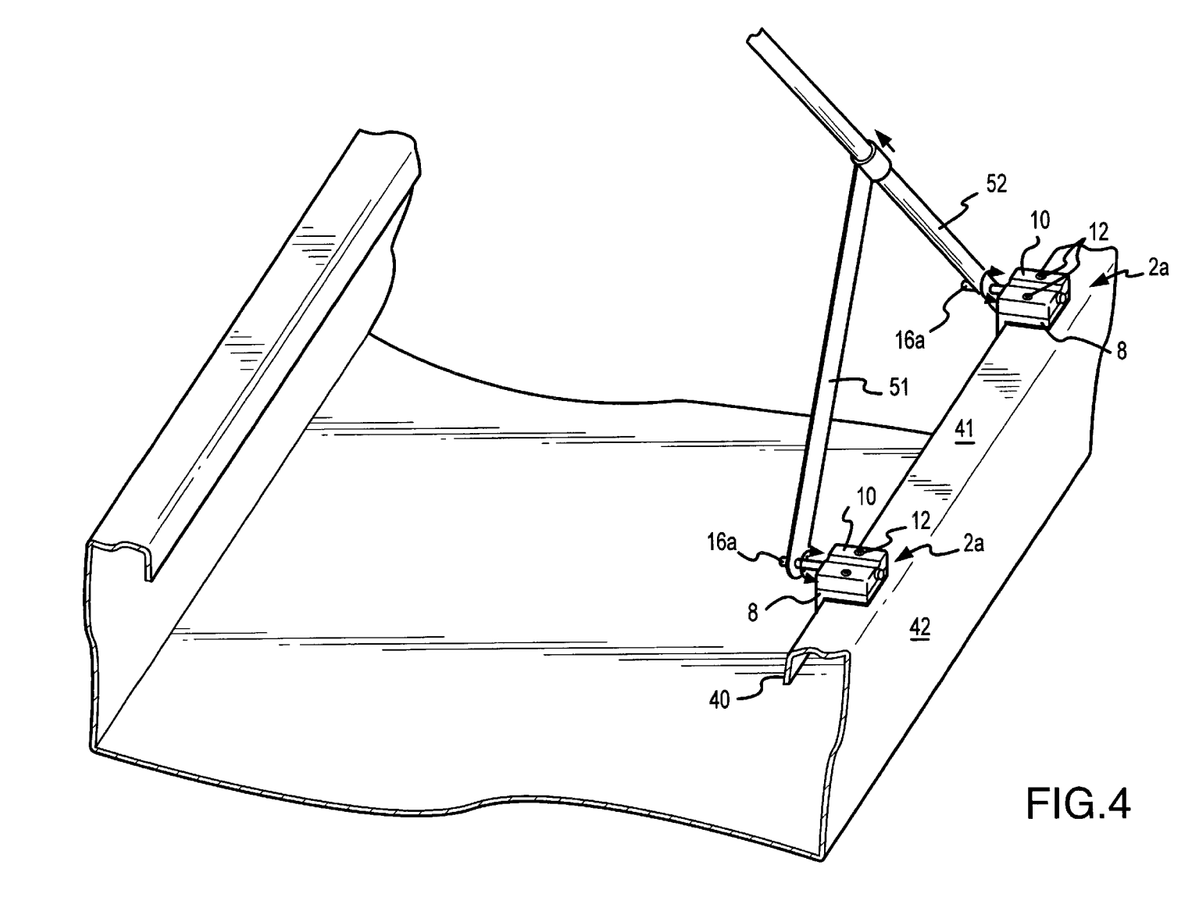
FIG. 4 is a fragmentary perspective view of the bed and lateral sides of a pick up truck with a fragmentary view of the lower braces of a collapsible cargo rack that are mounted for pivotal movement on the shaft of the anchor embodiment shown in FIG. 3. The anchors of FIG. 3 are shown for illustrative purposes as mounted on only one side of the bed of the truck., however is practice the anchors and braces would normally be on both sides.

FIGS. 3 and 4 disclose an anchor 2a similar to that of FIGS. 1 and 2 except that the shaft 16a is straight instead of having a bent end portion. The straight shaft is advantageous for attaching the pivotal members of the cargo carrying rack, such as that that might support a boat or similar load over the bed of a pick-up truck. In the illustration of FIG. 4 two bracing members 51 and 52 of a rack are shown pivotally mounted on the inner ends of the shaft 16a of two spaced apart anchors 2 of the present invention. Each of the anchors is clamped to the flat bent over upper extremity 41 of the side 42 of the bed of a pick-up truck. Each of the separate shafts 16a of the two anchors 2a can be adjusted by the journal box screws 12 to be non-rotatable or rotatable, depending on the operative nature of the braces or rack members that are attached to it.

Figure 5:
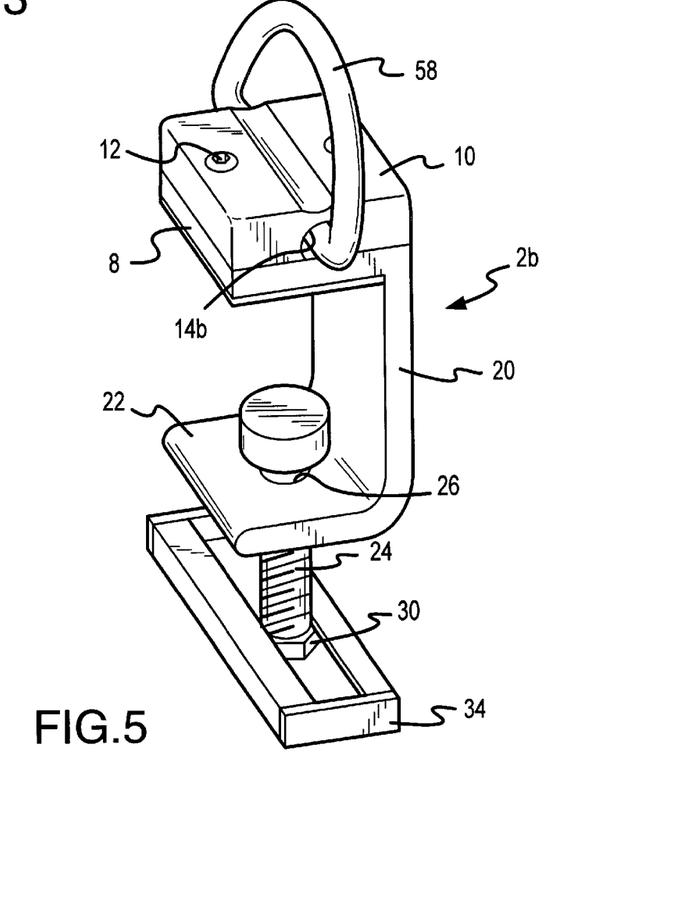
FIG. 5 is a perspective view of a third embodiment of the anchor. A "D" ring is rotatably secured in a transverse bore in the journal box.

FIG. 5 illustrates a third embodiment of the clamp 2b that utilizes a "D" ring 58 to hold a strap, rope, belt or other kind of load securing tie. In this embodiment the longitudinal axis of the transverse bore 14b is oriented ninety degrees from the position of the bore 14b on the other described embodiments. The respective diameters of the bore 16 and the stem of the "D" ring 58 are such that the stem of the ring is freely rotatable within the bore when the journal-adjusting screws 12 are tightened. This freedom of rotation allows the "D" ring to move in response to the necessary direction of the tie strap which is dependent on the location and size of the load.

There may be instances where it is not possible to engage the turned down inside edge of the flat upper extremity of the side of the truck bed with a "C" clamp type of clamping device 6, as shown in FIGS. 1–5. Such an impediment would occur with the use of a full bed liner that follows the sides of the truck bed upwardly from the surface of the bed and projects outwardly to cover at least a portion of the flat upper extremity 41. Such a bed liner would prohibit the entry of a "C" clamp type of device around the upper edge structure to which the clamp is to be secured.

Figure 6:
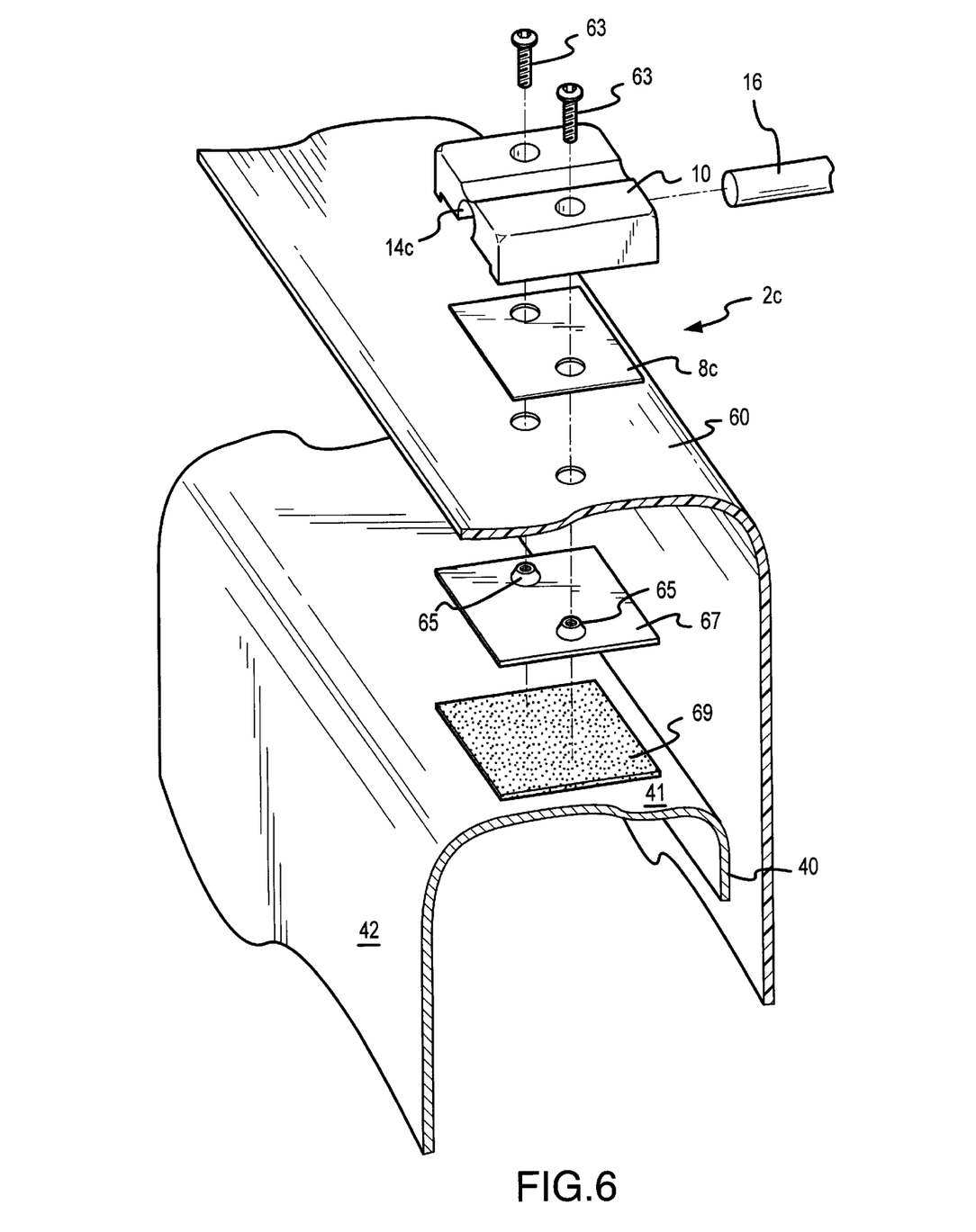
FIG. 6 is an exploded view of a further embodiment of the anchor of the present invention with a screw activated clamping plate that attaches to the top of the bed liner instead of the "C" type clamp utilized by the forgoing described embodiments. The side of the bed of the pick up truck and the bed liner are fragmentarily shown.
Figure 7:
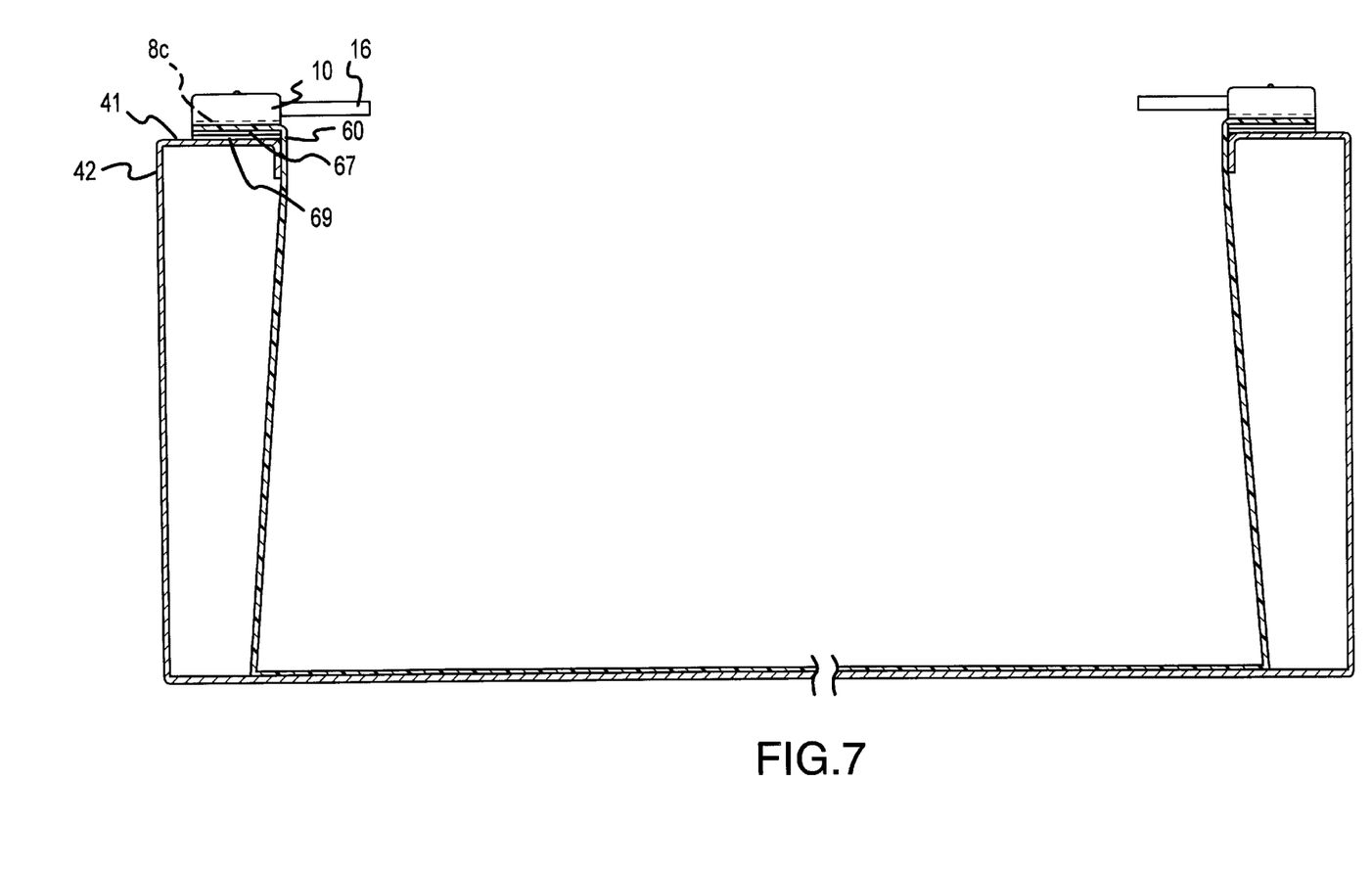
FIG. 7 is a cross sectional view of the bed of a pick up truck having a bed liner. The anchor embodiment shown in FIG. 3 is shown attached to the top edge of the bed liner, as more fully shown in FIG. 6.

FIG. 6 describes an alternative embodiment of the clamping device that overcomes the problem of inaccessibility of a "C" clamp. This embodiment avoids the necessity of making holes in the flat upper extremity 41 by providing a means for attaching the journal box directly to the outwardly turned edge of the bed liner 60. In this alternative embodiment, the base member 8c of the journal box does not require the mass associated with the base member being part of the "C" clamp, as in the embodiment of FIGS. 1–5. As in the preferred embodiment, the cleat 10 is superimposed over the base member 8c and is provided with a transverse bore 14c which, with the base member 8c, journals a shaft 16, or a "D" ring, similarly to the other embodiments. A pair of fastening and pressure adjusting screws 63 penetrate the cleat 10, the base member 8c, the bed liner 60 and threadingly engage a pair of nuts 65 attached to a clamping plate 67. The clamping plate is positioned on the underside of the outwardly turned edge of the bed liner. Thus, by tightening the adjusting screws 63 the anchor 2c will be secured to the rigid bed liner structure. In this alternative embodiment of the clamping structure, the shaft or "D" ring choices are the same as those for the "C" clamping embodiment. A rubber or felt pad 69 is preferably positioned between the clamping plate 67 and the flat upper extremity 41 of the side of the truck bed in order to insulate the paint on the truck bed from being damaged by contact with the clamping plate 67.

I claim:

1. A cargo anchor primarily intended for attachment to the upper rolled edge of the side of a truck bed, comprising,
    a "C" clamp having a stem with upper and lower extremities,
        a base member laterally projecting from the upper extremity of the stem,
        a leg laterally projecting from the lower extremity of the stem and carrying means for clamping,
    a cleat superimposed upon the base member,
    a transverse bore in at least one of either the base member or the cleat and disposed parallel to the base member and the cleat, defining, with the cleat and the base member, a journal box, and
    means for interconnecting the base member and the cleat.

2. The apparatus of claim 1 and further including,
    a shaft journaled for rotation in the transverse bore and extending externally from at least one side of the journal box.

3. The combination of claim 2, wherein the means for interconnecting the cleat to the base member comprises screw means that engage the cleat and the base member for selectively adjusting the proximity of the cleat to the base member.

4. The combination of claim 3 wherein the shaft is sized and dimensioned, with respect to the diameter of the bore, to permit the shaft to be selectively rotatable and longitudinally movable within the transverse bore or to be clamped in a fixed non rotating and non-movable position between the base member and the cleat by adjustment of the screw means.

5. The combination of claim 4 wherein the portion of the shaft exterior of the journal box is "L" shaped, defining a transverse leg on the end of the shaft.

6. The combination of claim 5 and further including tie means attached to the transverse leg for clasping another separate member, including cargo.

7. The apparatus of claim 1 and further including,
    a "D" shaped ring having a straight stem portion that is journaled for rotation within the transverse bore.

8. The combination of claim 3 and further including, a compression-applying shoe disposed in spaced apart and parallel relation to the base member adapted to engage the underside of the flat structural member to which the cargo anchor is attached and including means for attaching the journal box to a flat structural member comprising, a longitudinal extension of the screw means, which extension penetrates the base member and threadingly engages the compression-applying shoe to apply clamping pressure to the flat structural member.

9. The combination of claim 8 wherein the compression applying shoe is a nut.

10. The apparatus of claim 8 and further including, a "D" shaped ring having a straight stem portion defining said shaft that is journaled for rotation within the transverse bore.

11. The combination of claim 8 wherein the shaft is sized and dimensioned, with respect to the diameter of the bore, to permit the shaft to be selectively rotatable and longitudinally movable within the transverse bore or to be clamped in a fixed non rotating and non-movable position between the base member and the cleat by adjustment of the screw means.

12. The combination of claim 11 wherein the portion of the shaft exterior of the journal box is "L" shaped, defining a transverse leg on the end of the shaft.

13. The combination of claim 12 and further including tie means attached to the transverse leg for clasping another separate member, including cargo.

* * * * *

UNITED STATES PATENT AND TRADEMARK OFFICE
CERTIFICATE OF CORRECTION

PATENT NO. : 6,196,777 B1
DATED : March 6, 2001
INVENTOR(S) : Brent A. Price

Page 1 of 1

It is certified that error appears in the above-identified patent and that said Letters Patent is hereby corrected as shown below:

Column 3:
Line 51: Delete "bore 16" and insert instead --bore 14b--

Column 4:
Line 59: Delete "defming" and insert instead --defining--

Signed and Sealed this

Twelfth Day of June, 2001

*Attest:*

NICHOLAS P. GODICI
*Attesting Officer*  *Acting Director of the United States Patent and Trademark Office*